(12) United States Patent
Salkintzis

(10) Patent No.: US 10,904,942 B2
(45) Date of Patent: *Jan. 26, 2021

(54) NETWORK SLICE SELECTION IN A MOBILE COMMUNICATION NETWORK

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,144

(22) Filed: Jul. 15, 2019

(65) Prior Publication Data

US 2019/0342937 A1 Nov. 7, 2019

Related U.S. Application Data

(63) Continuation of application No. 15/967,330, filed on Apr. 30, 2018, now Pat. No. 10,356,838, which is a
(Continued)

(51) Int. Cl.
*H04W 76/27* (2018.01)
*H04W 48/18* (2009.01)
(Continued)

(52) U.S. Cl.
CPC ........... *H04W 76/27* (2018.02); *H04W 48/16* (2013.01); *H04W 48/18* (2013.01); *H04W 76/10* (2018.02);
(Continued)

(58) Field of Classification Search
CPC ..... H04W 76/10; H04W 76/12; H04W 76/15; H04W 76/11; H04W 76/18; H04W 76/28;
(Continued)

(56) References Cited

U.S. PATENT DOCUMENTS 9,961,713 B2 * 5/2018 Salkintzis ............. H04W 76/27
10,356,838 B2 * 7/2019 Salkintzis ............. H04W 76/27
(Continued)

FOREIGN PATENT DOCUMENTS

WO 2017080518 A1 5/2017

OTHER PUBLICATIONS

3GPP TR 23.711 V0.1.2 (Oct. 2015),"3rd Generation Partnership Project; Technical Specification Group Services and System Aspects; Enhancements of Dedicated Core Networks selection mechanism (Release 14)", pp. 1-17.
(Continued)

*Primary Examiner* — Diane D Mizrahi
(74) *Attorney, Agent, or Firm* — Kunzler Bean & Adamson

(57) ABSTRACT

Apparatuses, methods, and systems are disclosed for selecting a network slice. One apparatus includes a processor and a transceiver that communicates with a mobile communication network supporting a plurality of application categories. The processor receives a request to send a data packet, wherein the data packet is generated by an application of the apparatus. The processor identifies a network slice selection indicator associated with the application of the apparatus and transmits the data packet via a network connection to a network slice in the mobile communication network, wherein the network connection is associated with the identified network slice selection indicator.

20 Claims, 11 Drawing Sheets

Related U.S. Application Data continuation of application No. 15/050,840, filed on Feb. 23, 2016, now Pat. No. 9,961,713.

(51) Int. Cl.
*H04W 84/00* (2009.01)
*H04W 76/15* (2018.01)
*H04W 76/10* (2018.01)
*H04W 48/16* (2009.01)
*H04W 88/02* (2009.01)
*H04W 88/06* (2009.01)

(52) U.S. Cl.
CPC .......... *H04W 76/15* (2018.02); *H04W 84/00* (2013.01); *H04W 88/02* (2013.01); *H04W 88/06* (2013.01)

(58) Field of Classification Search
CPC ..... H04W 76/00; H04W 76/30; H04W 76/40; H04W 76/27; H04W 48/16; H04W 84/00; H04W 88/02; H04W 88/06
See application file for complete search history.

(56) References Cited

U.S. PATENT DOCUMENTS

| | | |
|---|---|---|
| 2002/0196789 A1 | 12/2002 | Patton |
| 2011/0058536 A1 | 3/2011 | Tsuchiya et al. |
| 2012/0099529 A1 | 4/2012 | Williams |
| 2013/0044623 A1 | 2/2013 | Speight et al. |
| 2014/0161024 A1 | 6/2014 | Speight et al. |
| 2014/0204835 A1 | 7/2014 | Speight et al. |
| 2014/0341109 A1 | 11/2014 | Cartmell et al. |
| 2015/0341937 A1 | 11/2015 | Speight et al. |
| 2017/0212857 A1 | 7/2017 | Keckler et al. |
| 2017/0245316 A1 | 8/2017 | Salkintzis |
| 2018/0199278 A1 | 7/2018 | Duan et al. |
| 2018/0227221 A1 | 8/2018 | Starsinic et al. |
| 2019/0150225 A1* | 5/2019 | Mohamed ......... H04W 28/0263 370/329 |

OTHER PUBLICATIONS

SK Telecom, "End-to End Network Slicing Requirements for Next Generation Access Technologies", 3GPP TSG RAN ad-hoc, Jan. 28-29, 2016, pp. 1-4.

Huawei, Hisilicon, "Key Issue on Policy Framework", SAWG2 Temporary Document, S2-161016, Feb. 23-26, 2016, pp. 1-2.

PCT/US2017/019088, Notification Transmittal of the International Search Report and the Written Opinion of the International Searching Authority, or the Declaration, dated Jun. 20, 2017, pp. 1-20.

NTT DoCoMo, "Network Slicing Service Trafic Dependent Selection", 3GPP TSG SA WG1 Meeting #71, S1-152156, Aug. 17-21, pp. 1-4.

CATT, "Smarter Requirement of UE Obtaining Services from Different Network Slices Simultaneously", 3GPP TSG SA WG1 Meeting #71, S1-152200, Aug. 17-21, 2015, pp. 1-4.

Motorola Mobility, Lenovo, "Solution PDU Sessions Served by Different Network Slices", SA WG2 Meeting #114, S2-161574, Apr. 11-15, 2016, pp. 1-3.

ZTE Corporation, China Unicom, "Update the Network Slicing Use Case in Smarter", 3GPP TSG-SA WG1 Meeting #71, S1-152074, Aug. 17-21, 2015, pp. 1-4.

3GPP, "3rd Generation Partnership Project; Technical Specification Group Services and System Aspects; Architecture enhancements for non-3GPP accesses (Release 13)", 3GPP TS 23.402 V13.4.0, Dec. 2015, pp. 1-298.

3GPP, "3rd Generation Partnership Project; Technical Specification Group Services and System Aspects; Architecture Enhancements for Dedicated Core Networks; Stage 2 (Release 13)", 3GPP TR 23.707 V13.0.0, Dec. 2014, pp. 1-39.

3GPP, 3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.1.0, Dec. 2015, pp. 1-314.

3GPP, "3rd Generation Partnership Project; Technical Specification Group Services and System Aspects; Feasibility Study on New Services and Markets Technology Enablers; Stage 1 (Release 14)", 3GPP TR 22.891 V1.3.2, Feb. 2016, pp. 1-95.

3GPP, "3rd Generation Partnership Project; Technical Specification Group Core Network and Terminals; Non-Access-Stratum (NAS) functions related to Mobile Station (MS) in idle mode (Release 13)", 3GPP TS 23.122 V13.3.0, Sep. 2015, pp. 1-49.

* cited by examiner

NETWORK SLICE SELECTION IN A MOBILE COMMUNICATION NETWORK

CROSS-REFERENCE TO RELATED APPLICATIONS

This is a continuation application of and claims priority to U.S. patent application Ser. No. 15/967,330 entitled "Supporting Network Slicing in a Wireless Communication System" and filed on Apr. 30, 2018 for Apostolis Salkintzis, which is incorporated herein by reference, and to U.S. patent application Ser. No. 15/050,840 entitled "Procedures to Support Network Slicing in a Wireless Communication System" and filed on Feb. 23, 2016 for Apostolis Salkintzis, which is also incorporated herein by reference.

FIELD

The subject matter disclosed herein relates generally to wireless communications and more particularly relates to selecting a network slice in a mobile communication network.

BACKGROUND

The following abbreviations are herewith defined, at least some of which are referred to within the following description.
3GPP Third Generation Partnership Project
ANDSF Access Network Discovery and Selection Function
AP Access Point
APN Access Point Name
AS Access Stratum
CIoT Cellular Internet of Things
DCN Dedicated Core Network
DL Downlink
eNB Evolved Node B
EPC Evolved Packet Core
ETSI European Telecommunications Standards Institute
H-PLMN Home Public Land Mobile Network
HSS Home Subscriber Server
IMS IP Multimedia Subsystem
IP Internet Protocol
IoT Internet of Things
ISP Internet Service Provider
LAN Local Area Network
LTE Long Term Evolution
MBB Mobile Broadband
MME Mobility Management Entity
MMS Multimedia Messaging Service
MTC Machine-Type Communications
NAS Non-Access Stratum
NFV Network Function Virtualization
OFDM Orthogonal Frequency Division Multiplexing
PDCP Packet Data Convergence Protocol
PDU Protocol Data Unit
PGW Packet Data Network Gateway
PLMN Public Land Mobile Network
RAN Radio Access Network
RCS Rich Communication Services
RRC Radio Resource Control
SC-FDMA Single Carrier Frequency Division Multiple Access
SGW Serving Gateway
SUPL Secure User Plane Location
TCP Transmission Control Protocol
UE User Entity/Equipment (Mobile Terminal)
UL Uplink
WAN Wide Area Network
WiMAX Worldwide Interoperability for Microwave Access
WLAN Wireless Local Area Network In wireless communications networks, next generation of wireless networks (e.g., fifth-generation or "5G" networks) are expected to support different network slices. Each network slice can be seen as an independent network partition optimized to support the performance requirements of a certain application category. For example, a wireless communication network may contain a network slice optimized for mobile broadband services (characterized by high data rate and medium latency), a network slice optimized for autonomous driving (characterized by low latency and high reliability), a network slice optimized for massive Internet of Things ("IoT") or Machine Type Communications ("MTC") (characterized by low mobility and low data rate), and the like. Note that all network slices are deployed inside the same public land mobile network ("PLMN").

Different application categories can be supported with different network slices, each network slice being optimized to support its corresponding application category. One slice may be designed to support an "Enhanced Mobile Broadband" application category, a second slice may be designed to support an "Ultra-reliable and Low Latency Communications" application category, and a third slice may be designed to support a "Massive Machine Type Communications" application category. A particular type of network slice may be deployed multiple times (i.e. have multiple instances) within the same PLMN. For example, a network operator may deploy multiple IoT/MTC slice instances to support multiple IoT customers such as utility companies, automotive companies, etc.

It is expected that network slices will be created and managed via network function virtualization ("NFV") procedures. In a typical scenario, a network operator defines different virtual network templates, each one specifying a collection of compute, storage, and/or network resources and their configurations. Such template is essentially a representation of a network slice. When the operator wants to create a new slice, the operator instructs the NFV platform to construct a new virtual network based on a given template. The template may also contain rules for auto-scaling the resources of a slice in order to efficiently handle workload variations in the time domain.

In order to support several 5G application categories, it will be necessary for the same mobile device (e.g., User Equipment ("UE")) to connect to multiple network slices. No existing solution enables a UE to both select a desired network slice (based on some criteria) and to attach to the selected network slice.

BRIEF SUMMARY

Methods for selecting a network slice are disclosed. Apparatuses and systems also perform the functions of the methods. One method, e.g., of a remote unit, includes receiving a request to send a data packet, wherein the data packet is generated by an application of the remote unit. The method includes identifying a network slice selection indicator associated with the application of the remote unit and transmitting the data packet via a network connection to a network slice in a mobile communication network, said mobile communication network supporting a plurality of network slices, wherein the network connection is associated with the identified network slice selection indicator.

In some embodiments, transmitting the data packet via the network connection to the network slice includes determining whether a network connection associated with the identified network slice selection indicator exists between the remote unit and the mobile communication network, transmitting the data packet via an existing network connection in response to determining that a network connection associated with the network slice selection indicator exists between the remote unit and the mobile communication network, and establishing a new network connection with the identified network slice selection indictor for transmitting the data packet in response to determining that a network connection associated with the network slice selection indicator does not exist between the remote unit and the mobile communication network.

In some embodiments, the method further includes receiving a selection policy from the mobile communication network, the selection policy being stored at the remote unit and comprising a plurality of rules for selecting a network slice based on the application. In such embodiments, identifying the network slice selection indicator associated with the application includes applying the selection policy to the application.

In some embodiments, receiving the request to send the data packet includes receiving a network connection request that contains an application category parameter. In such embodiments, identifying the network slice selection indicator associated with the application includes verifying the application category parameter using a selection policy. In certain embodiments, verifying the application category parameter using a selection policy comprises determining whether the application is permitted to use a network slice associated with the application category parameter. In certain embodiments, the application category parameter indicates a category selected from the group consisting of: a mission-critical application, an infrequent messaging application, and a general-purpose application.

In some embodiments, the network connection to a network slice in the mobile communication network includes a connection to a network slice that supports a traffic type associated with the application. In some embodiments, receiving the request to send the data packet includes receiving a network connection request that contains a network capability parameter. In such embodiments, identifying the network slice selection indicator associated with the application includes applying a selection policy to the network capability parameter to select the network slice selection indicator.

In some embodiments, receiving the request to send the data packet includes receiving a network connection request that contains a transport type parameter. In such embodiments, identifying the network slice selection indicator associated with the application includes applying a selection policy to the transport type parameter to select the network slice selection indicator. In certain embodiments, the transport type parameter indicates one or more of: an access network type, a virtual private network, a transport protocol, and a modem type.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
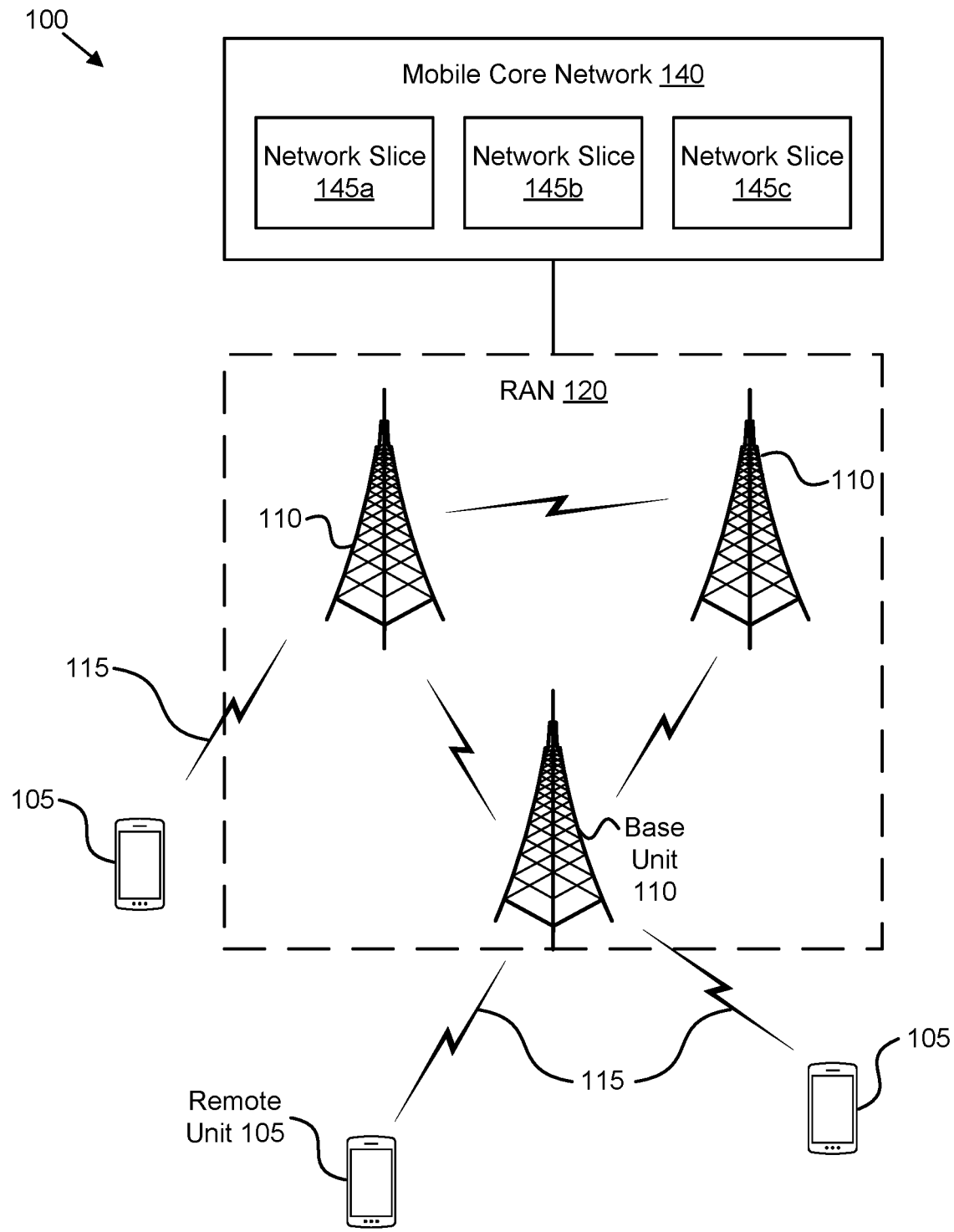
FIG. 1 is a schematic block diagram illustrating one embodiment of a wireless communication system for selecting a network slice.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer-readable storage devices. Where a module or portions of a module are implemented in software, the software portions are stored on one or more computer-readable storage devices.

Any combination of one or more computer-readable medium may be utilized. The computer-readable medium may be a computer-readable storage medium. The computer-readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider ("ISP")).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. Such code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived of that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In order to support several 5G application categories simultaneously, a user equipment ("UE") is configured to connect to multiple network slices simultaneously. Each network slice is optimized for a certain application category. In order to optimize the communication performance in this application category and potentially to reduce also the UE's battery consumption, the UE could steer one type of traffic to a network slice dedicated to that application category and all other traffic to another network slice that is optimized to support general mobile broadband ("MBB") traffic. For instance, a UE in a vehicle may behave both as an IoT gateway and as a smartphone. The UE may have an application that retrieves data from the vehicle's electronic system and reports them to a cloud server for analysis and diagnostics and may also have applications (telephony, web browsing, etc.) that enable the typical smartphone experience. In order to optimize the communication performance and potentially to reduce also the UE's battery consumption, the UE could steer the IoT traffic to the IoT network slice and all other traffic to the MBB network slice that is optimized to support smartphone applications.

By enabling UEs to connect to different network slices that cater to different application categories, UE vendors are able to produce devices that can also be used in IoT application categories and, thus, would increase the value of the devices and would bring more experiences to the end users in a way that optimizes the network performance and reduces the UE battery consumption. Further, communication performance and battery life may be increased by allowing the UE to selectively connect to an appropriate network slice. In order to enable a UE to selectively connect to an appropriate network slice (and to connect simultaneously with multiple network slices, as needed) the UE must be able to (a) select a desired network slice (based on some criteria) and (b) attach to the selected network slice. The present disclosure specifies such a UE.

The concept of network slicing is similar to the concept of dedicated core networks ("DCN") supported in 3GPP Rel-13 specifications. A Rel-13 3GPP network may support multiple core networks, each one dedicated to a certain use case. For example, a first DCN may serve smartphones and tablets, while a second and third DCN may serve smart meters that report electricity and water consumption, respectively. Each UE is statically assigned to a DCN based on subscription information. Accordingly, when the UE attaches to the PLMN, the serving MME, and thus the serving DCN, is selected based on subscription information retrieved from HSS.

All dedicated core networks have the same functional elements (MMES, SGWs, PGWs, etc.) and they apply the same control and user plane procedures (e.g. the same RRC and S1 signaling procedures). In contrast, different network slices may have entirely different network architectures and use different procedures. For example, the network slice used for IoT may use much different RRC procedures from the network slice used for MBB. Also, the network slice used for IoT may use a completely different radio technology from the network slice used for MBB (e.g. Narrowband IoT vs. LTE-Advanced). Thus, a key difference between network slicing and dedicated core networks is that different network slices can be based on different architectures and procedures, while the different dedicated core networks are all based on the same architecture and procedures.

FIG. 1 depicts an embodiment of a wireless communication system 100 for selecting a network slice. In one embodiment, the wireless communication system 100 includes remote units 105, base units 110, and wireless communication links 115. Even though a specific number of remote units 105, base units 110, and wireless communication links 115 are depicted in FIG. 1, one of skill in the art will recognize that any number of remote units 105, base units 110, and wireless communication links 115 may be included in the wireless communication system 100.

The base units 110 form a radio access network ("RAN") 120. The RAN 120 is communicatively coupled to a mobile core network 140, such as a 5G packet core or the evolved packet core ("EPC") specified in LTE specifications. Note that the present disclosure is not intended to be limited to the implementation of any particular wireless communication system architecture or protocol. Thus, in a non-LTE implementation, the RAN 120 may be coupled to a different type of packet core network, such as to a "5G" packet core network. The mobile core network 140 belongs to a single public land mobile network ("PLMN") and includes a plurality of network slices, including a first network slice 145a, a second network slice 145b, and a third network slice 145c (collectively referred to as "network slices 145"). Even though a specific number of network slices 145 are depicted in FIG. 1, one of skill in the art will recognize that any number of network slices 145 may be included in the mobile core network 140. Each network slice 145 may be optimized for a particular application category. For example, a first network slice 145 may be optimized for mobile broadband services (high data rate, medium latency), a second network slice 145b may be optimized for autonomous driving (low latency, high reliability), and a third network slice 145c may be optimized for massive IoT/MTC (low mobility, low data rate). Each optimized service provided by a network slice 145 may correspond to an application category. Further, two or more of the network slices 145 may be optimized for the same application category (e.g., the mobile core network 140 may include multiple instances of a network slice 145 optimized for a particular application category).

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") communication signals. Furthermore, the UL communication signals may be carried over the wireless communication links 115.

The base units 110 may be distributed over a geographic region. In certain embodiments, a base unit 110 may also be referred to as an access point, an access terminal, a base, a base station, a Node-B, an eNB, a Home Node-B, a relay node, a device, or by any other terminology used in the art. The base units 110 are generally part of a radio access network 120 that may include one or more controllers communicably coupled to one or more corresponding base units 110. The radio access network 120 is generally communicably coupled to one or more core networks (such as the mobile core network 140), which may be coupled to other networks, like the Internet and public switched telephone networks, among other networks. These and other elements of radio access and core networks are not illustrated but are well known generally by those having ordinary skill in the art. For example, one or more base units 110 may be communicably coupled to a mobility management entity ("MME"), a serving gateway ("SGW"), and/or a packet data network gateway ("PGW") in the core network.

In one implementation, the wireless communication system 100 is compliant with the long-term evolution ("LTE") of the 3GPP protocol, wherein the base unit 110 transmits using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 110 may serve a number of remote units 105 within a serving area, for example, a cell or a cell sector via a wireless communication link. The base units 110 may communicate directly with one or more of the remote units 105 via communication signals.

The base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 may communicate with one or more of the remote units 105 and/or one or more of the base units 110.

In one embodiment, an apparatus (e.g., UE, remote unit 105) may determine an application category associated with a data packet and request a network connection to a network slice 145 corresponding to the identified application category. In such an embodiment, a category selection policy may be used to identify which application category is associated with the data packet. The category selection policy may include one or more rules for selecting the application category based on characteristics of the data packet. The apparatus may then communicate the data packet and any subsequent data packets of the same application category over a network slice 145 optimized for the application category. Further, the apparatus may receive one or more return data packets over the same network slice 145, the return packets being responses to the transmitted data packets. Accordingly, by selecting and communicating over a network slice 145 optimized for an application category associated with the data packet(s), the apparatus optimizes the communication performance in this application category and potentially reduce the UE's battery consumption.

In certain embodiments, an application of a remote unit 105 generates a data packet that is to be transmitted via a mobile communication network (e.g., the RAN 120 and mobile core network 140), where the mobile communication network supports a plurality of network slices 145. Here, the remote unit 105 identifies a network slice selection indicator associated with the data packet and transmits the data packet using a network connection to a network slice in the mobile communication network, where the network connection is associated with the identified network slice selection indicator.

In one embodiment, the remote unit 105 determines whether a network connection associated with the identified network slice selection indicator already exists between the remote unit 105 and the mobile communication network (e.g., the mobile core network 140) and establishes a new network connection with the indicated network slice in response to a network connection associated with the network slice selection indicator not existing between the remote unit 105 and the mobile communication network. Here, transmitting the data packet includes the remote unit 105 transmitting via the new network connection.

Figure 2:
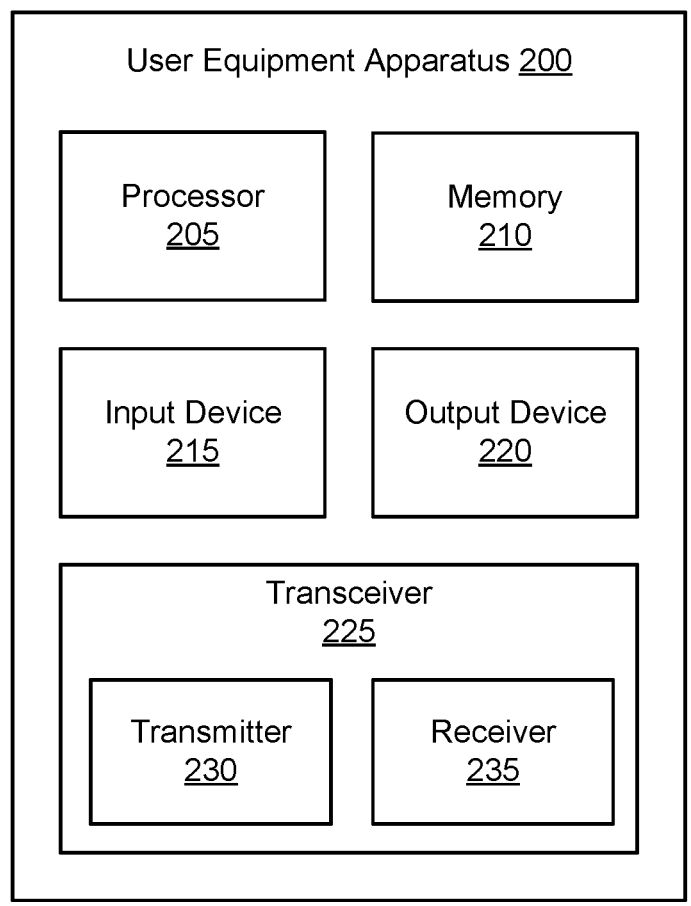
FIG. 2 is a schematic block diagram illustrating one embodiment of a user equipment apparatus that may be used for selecting a network slice.

FIG. 2 depicts one embodiment of a user equipment apparatus 200 that may be used for selecting a network slice. In various embodiments, the user equipment apparatus 200 may be one embodiment of the remote unit 105. As depicted, the user equipment apparatus 200 may include a processor 205, a memory 210, an input device 215, an output device 220, and a transceiver 225. In some embodiments, the input device 215 and the output device 220 are combined into a single device, such as a touchscreen. In certain embodiments, the user equipment apparatus 200 may not include any input device 215 and/or output device 220. In various embodiments, the user equipment apparatus 200 may include one or more of the processor 205, the memory 210, and the transceiver 225, and may not include the input device 215 and/or the output device 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the output device 220, and the transceiver 225. In certain embodiments, the processor 205 may identify an application category associated with a received data packet (e.g., received from an application executing on the processor 205) and control the transceiver 225 to request a network connection corresponding to the identified application category.

In various embodiments, the processor 205 receives a request to send a data packet, wherein the data packet is generated by an application of the user equipment apparatus 200. The processor 205 may identify a network slice selection indicator associated with the application of the apparatus and control the transceiver 225 to transmit the data packet via a network connection to a network slice in the mobile communication network, wherein the network connection is associated with the identified network slice selection indicator.

In certain embodiments, transmitting the data packet via the network connection to the network slice includes the processor 205 determining whether a network connection associated with the identified network slice selection indicator exists between the remote unit and the mobile communication network. In response to the processor 205 determining that a network connection associated with the network slice selection indicator exists between the remote unit and the mobile communication network, the transceiver 225 transmits the data packet via an existing network connection. In response to determining that a network connection associated with the network slice selection indicator does not exist between the remote unit and the mobile communication network, the processor 205 establishes a new network connection with the identified network slice selection indictor for transmitting the data packet. Thereafter, the transceiver 225 uses this new network transmission to transmit the data packet.

In certain embodiments, the processor 205 further receives a selection policy from the mobile communication network, the selection policy being stored at the apparatus and comprising a plurality of rules for selecting a network slice based on the application. In such embodiments, identifying the network slice selection indicator associated with the application includes the processor 205 applying the selection policy to the application.

In certain embodiments, receiving the request to send the data packet includes the processor 205 receiving a network connection request that contains an application category parameter. In such embodiments, identifying the network slice selection indicator associated with the application includes the processor 205 verifying the application category parameter using a selection policy. In certain embodiments, verifying the application category parameter includes the processor 205 determining whether the application is permitted to use a network slice associated with the application category parameter. In certain embodiments, the application category parameter indicates a category selected from the group consisting of: a mission-critical application, an infrequent messaging application, and a general-purpose application.

In some embodiments, the network connection to a network slice in the mobile communication network includes a connection to a network slice that supports a traffic type associated with the application. In certain embodiments, receiving the request to send the data packet includes the processor 205 receiving a network connection request that contains a network capability parameter. In such embodiments, the processor 205 identifies the network slice selection indicator associated with the application by applying a selection policy to the network capability parameter to select the network slice selection indicator.

In certain embodiments, receiving the request to send the data packet includes the processor 205 receiving a network connection request that contains a transport type parameter. In such embodiments, the processor 205 identifies the network slice selection indicator associated with the application by applying a selection policy to the transport type parameter to select the network slice selection indicator. Here, the transport type parameter may indicate one or more of: an access network type, a virtual private network, a transport protocol, and a modem type.

The memory 210, in one embodiment, is a computer-readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media. In some embodiments, the memory 210 stores data relating to a category selection policy. In some embodiments, the memory 210 also stores program code and related data, such as an operating system or other controller algorithms operating on the user equipment apparatus 200.

The input device 215, in one embodiment, may include any known computer input device including a touch panel, a button, a keyboard, a stylus, a microphone, or the like. In some embodiments, the input device 215 may be integrated with the output device 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The output device 220, in one embodiment, may include any known electronically controllable display or display device. The output device 220 may be designed to output visual, audible, and/or haptic signals. In some embodiments, the output device 220 includes an electronic display capable of outputting visual data to a user. For example, the output device 220 may include, but is not limited to, an LCD display, an LED display, an OLED display, a projector, or similar display device capable of outputting images, text, or the like to a user. As another, non-limiting, example, the output device 220 may include a wearable display such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

In certain embodiments, the output device 220 includes one or more speakers for producing sound. For example, the output device 220 may produce an audible alert or notification (e.g., a beep or chime). In some embodiments, the output device 220 includes one or more haptic devices for producing vibrations, motion, or other haptic feedback. In some embodiments, all or portions of the output device 220 may be integrated with the input device 215. For example, the input device 215 and output device 220 may form a touchscreen or similar touch-sensitive display. In other embodiments, the output device 220 may be located near the input device 215.

The transceiver 225 communicates with the mobile communication network supporting a plurality of application categories via a plurality of network slices, each network slice associated with a particular application category. In one embodiment, the transceiver 225 is used to request a network connection corresponding to an identified application category and otherwise communicate with the base unit 110. For example, the transmitter 230 may request a network connection associated with an application category by transmitting a radio resource control ("RRC") connection setup message, such as an RRC Connection Setup Complete message, containing an application category parameter corresponding to the identified application category.

The transceiver 225 includes at least transmitter 230 and at least one receiver 235. One or more transmitters 230 may be used to provide UL communication signals to a base unit 110, such as the UL transmissions described herein. Similarly, one or more receivers 235 may be used to receive DL communication signals from the base unit 110, as described herein. Although only one transmitter 230 and one receiver 235 are illustrated, the user equipment apparatus 200 may have any suitable number of transmitters 230 and receivers 235. Further, the transmitter(s) 230 and the receiver(s) 235 may be any suitable type of transmitters and receivers. In one embodiment, the transceiver 225 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 225, transmitters 230, and receivers 235 may be implemented as physically separate components that access a shared hardware resource and/or software resource, such as for example, a radio network interface.

In various embodiments, one or more transmitters 230 and/or one or more receivers 235 may be implemented and/or integrated into a single hardware component, such as a multi-transceiver chip, a system-on-a-chip, an ASIC, or other type of hardware component. In certain embodiments, one or more transmitters 230 and/or one or more receivers 235 may be implemented and/or integrated into a multi-chip module. In some embodiments, other components such as the radio network interface or other hardware components/circuits may be integrated with any number of transmitters 230 and/or receivers 235 into a single chip. In such embodiment, the transmitters 230 and receivers 235 may be logically configured as a transceiver 225 that uses one more common control signals or as modular transmitters 230 and receivers 235 implemented in the same hardware chip or in a multi-chip module.

Figure 3:
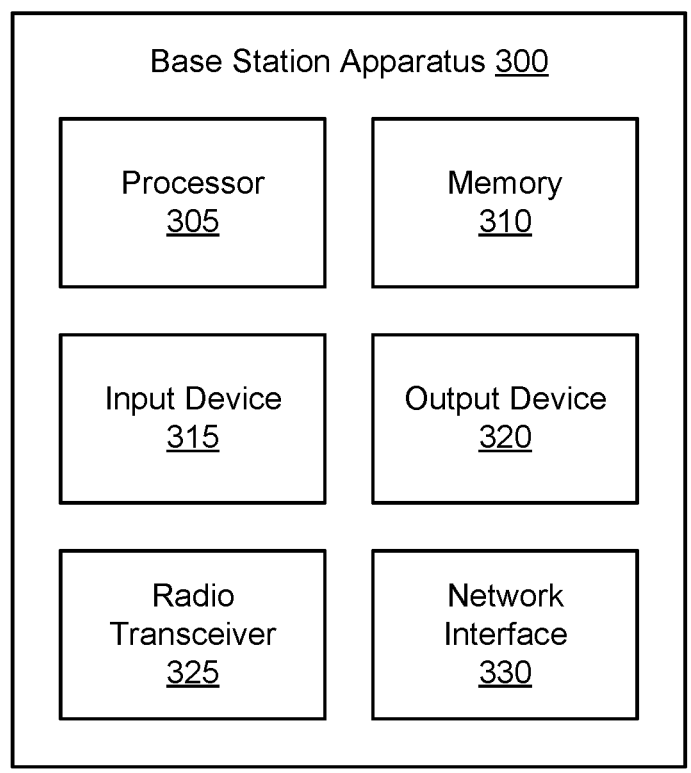
FIG. 3 is a schematic block diagram illustrating one embodiment of a base station apparatus that may be used for supporting network slicing.

FIG. 3 depicts another embodiment of a base station apparatus 300 that may be used for supporting network slicing. The base station apparatus 300 includes one embodiment of the base unit 110. Furthermore, the base unit 110 may include a processor 305, a memory 310, an input device 315, an output device 320, a radio transceiver 325, and a network interface 330. As may be appreciated, the processor 305, the memory 310, the input device 315, and the output device 320 may be substantially similar to the processor 205, the memory 210, the input device 215, and the output device 220 of the user equipment apparatus 200, respectively. In certain embodiments, the processor 305 may be used to determine whether the base unit 110 will apply traffic steering rules for routing data traffic on a first route across a first access network and a second route across a second access network.

In some embodiments, the processor 305 controls the radio transceiver 325 to transmit DL signals to a remote unit 105. The processor 305 may also control the radio transceiver 325 to receive UL signals from the remote unit 105. For example, the processor 305 may control the radio transceiver 325 to receive a RRC Connection Request and transmit an RRC Connection Setup message. The processor 305 may further identify an application category parameter included in a received RRC Connection Setup Complete message and select a network slice 145 based on the application category parameter. The processor 305 may then establish a connection between the remote unit 105 and the selected network slice 145, for example via the radio transceiver 325 and the network interface 330.

In various embodiments, the processor 305 receives, via the radio transceiver 325, a request to establish a network connection with the mobile communication network and identifies a network slice selection indicator associated with the request. In one embodiment, the request is a radio resource control ("RRC") message containing the network slice selection indicator. For example, the RRC message may be an RRC connection setup message (e.g., transmitted during an RRC connection setup procedure). In other embodiments, the RRC message may be a non-setup message.

In some embodiments, the processor 305 selects a management function in a network slice 145 that supports the network slice selection indicator and establishes, via the network interface 330, the requested connection by using the selected management function in the network slice 145. In certain embodiments, selecting the management function in a network slice based on the network slice selection indicator includes the processor 305 identifying a network slice that supports an application category indicated in the network slice selection indicator. In one embodiment, the application category is selected from the group consisting of: a mission-critical application, an infrequent messaging application, and a general-purpose application.

In certain embodiments, the processor 305 establishes, e.g., via the network interface 330, a signaling connection with a management function in each network slice 145 in the mobile communication network. Here, the processor 305 also identifies a traffic type associated with each management function. In such embodiments, selecting the management function in a network slice 145 based on the network slice selection indicator includes the processor 305 matching the network slice selection indicator to a network slice 145 using the traffic type associated with the management function in a network slice 145.

In some embodiments, establishing the requested connection by using the selected management function in the selected network slice includes the processor 305 sending an initial user equipment ("UE") message to the selected management function and receiving a downlink non-access stratum ("NAS") transport message from the selected management function.

The radio transceiver 325, in one embodiment, is configured to communicate wirelessly with the remote unit 105. In certain embodiments, the radio transceiver 325 comprises a transmitter used to transmit DL communication signals to the remote unit 105 and a receiver used to receive UL communication signals from the remote unit 105. For example, the receiver may receive a RRC Connection Request and the transmitter may transmit an RRC Connection Setup message.

The radio transceiver 325 may communicate simultaneously with a plurality of remote unit 105. For example, the transmitter may transmit DL communication signals received by multiple remote units 105. As another example, the receiver may simultaneously receive UL communication signals from multiple remote units 105. The radio transceiver 325 may include any suitable number and any suitable types of transmitters and receivers. Upon selection of a network slice 145 based on a received application category parameter, the base unit 110 may bridge the remote unit 105 to the selected network slice 145 via the radio transceiver 325 and the network interface 330

The radio transceiver 325 includes at least one transmitter and at least one receiver. One or more transmitters may be used to provide DL communication signals to the remote units 105, such as the DL transmissions described herein. Similarly, one or more receivers may be used to receive UL communication signals from the remote units 105, as described herein. Moreover, the base station apparatus 300 may have any suitable number of transmitters and receivers. Further, the transmitter(s) and the receiver(s) may be any suitable type of transmitters and receivers. In one embodiment, the radio transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers, transmitters, and receivers may be implemented as physically separate components that access a shared hardware resource and/or software resource, such as for example, a radio network interface.

In various embodiments, one or more transmitters and/or one or more receivers may be implemented and/or integrated into a single hardware component, such as a multi-transceiver chip, a system-on-a-chip, an ASIC, or other type of hardware component. In certain embodiments, one or more transmitters and/or one or more receivers may be implemented and/or integrated into a multi-chip module. In some embodiments, other components such as the radio network interface or other hardware components/circuits may be integrated with any number of transmitters and/or receivers into a single chip. In such embodiment, the transmitters and receivers may be logically configured as a transceiver that uses one more common control signals or as modular transmitters and receivers implemented in the same hardware chip or in a multi-chip module.

The network interface 330, in one embodiment, is configured to communicate with one or more network functions in the mobile core network 140. In one embodiment, the network interface 330 establishes network connections with one or more network slices 145 within the mobile core network 140. For example, the processor 305 may control the network interface 330 to establish a network connection with one or more MMEs within a network slice 145 using S1 setup request and S1 setup response messages. Upon selection of a network slice 145 based on a received application category parameter the network interface 330 may bridge the remote unit 105 to the selected network slice 145 using known signaling messages between the remote unit 105, the base unit 110, and the mobile core network 140.

Figure 4:
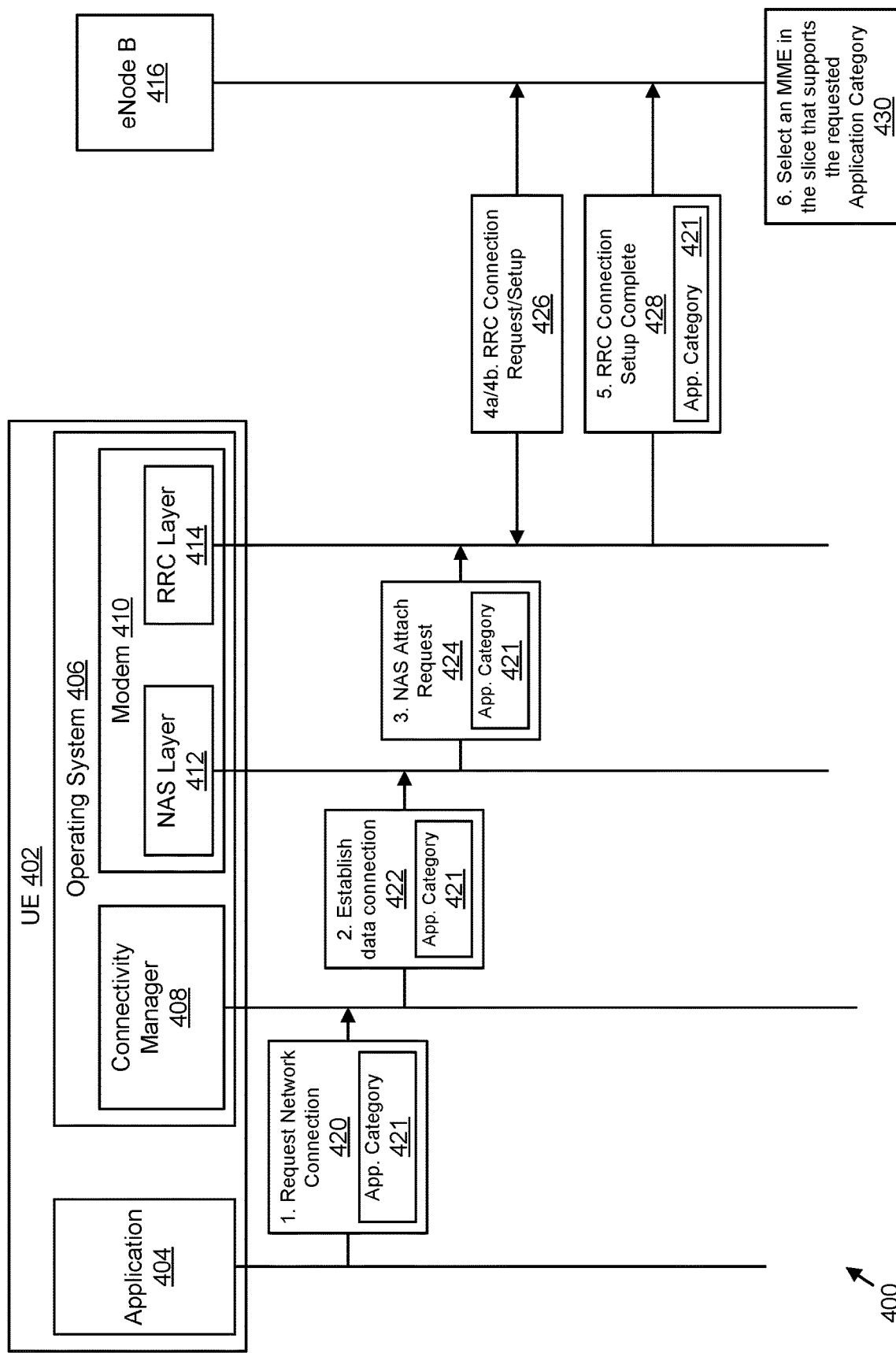
FIG. 4 illustrates one embodiment of a network attach procedure used for supporting network slicing.

FIG. 4 illustrates one embodiment of a network attach procedure 400 used for supporting network slicing. In the illustrated embodiment, communication with a UE 402 and an eNode B ("eNB") 416 are illustrated. In certain embodiments, the UE 402 may be one embodiment of the remote unit 105. In some embodiments, the eNB 416 may be one embodiment of the base unit 110. Moreover, communication between an application 404 running on the UE 402 and an operating system ("OS") 406 running on the UE 402 are illustrated. The OS 406 may include a connectivity manager 408 and a cellular modem 410. The cellular modem 410 may include a non-access stratum ("NAS") layer 412 and a radio resource control ("RRC") layer 414 as part of the access stratum layer.

As illustrated, the application 404 may request the OS 406 to establish a network connection with certain characteristics. To do so, the application 404 may send a "Request Network Connection" message 420 to the connectivity manager 408 of the OS 406. In one embodiment, the OS 406 is an ANDROID™ operating system and the "Request Network Connection" message 420 corresponds to a "requestNetwork( )" API call. The "Request Network Connection" message 420 indicates the type of service(s) that should be accessible via the connection.

The "Request Network Connection" message 420 includes an application category parameter 421 which indicates how the requested network connection will be used by the application 404. For example, the application category parameter 421 may indicate "ApplicationCategory= General-Purpose" if the connection is going to be used for accessing general-type of services, such as web browsing, email, video/audio streaming, or the like. In another example, the application category parameter 421 may indicate "ApplicationCategory=Mission-Critical" if the connection is going to be used for low-latency, mission-critical communications such as public-safety communication, self-automated driving, or the like. In yet another example, the application category parameter 421 may indicate "ApplicationCategory=Infrequent Messaging" if the connection is going to be used for infrequently sending of data, such as relaying sensor data to a cloud server.

The application category parameter 421 helps the OS 406 and/or the eNB 416 select an appropriate network slice for supporting the requested connection. For example, if the application indicates "ApplicationCategory=Infrequent Messaging", then the eNB 416 may establish the requested connection via the network slice that is optimized to support IoT or MTC traffic. In certain embodiments, the application category parameter 421 may be associated with the application 404, so that all network communication by the application 404 is associated with a single application category. In other embodiments, the application 404 may have network communications in more than one application category. The specific values of the application category parameter 421 given above are exemplary, and non-limiting. In some embodiments, the format and acceptable values of the application category parameter 421 may be defined by a network operator and/or by a network standards body (e.g., the 3GPP or other telecommunications association).

In some embodiments, the "Request Network Connection" message 420 also includes a "network capabilities"

parameter indicating a requested network service type. For example, the "network capabilities" parameter may request IP Multimedia Subsystem ("IMS") services, multimedia messaging service ("MMS") services, Internet services, rich communication services ("RCS") services, secure user plane location ("SUPL") services, or the like. In some embodiments, the "Request Network Connection" message 420 also includes a "transport type" parameter indicating a requested type of transport. For example, the "transport type" parameter may request transport via cellular connection, WLAN connection (e.g., a WIFI® or BLUETOOTH® connection), Ethernet connection, virtual private network ("VPN"), or the like.

The connectivity manager 408 receives the "Request Network Connection" message 420 and determines whether the application 404 is permitted to utilize the requested application category parameter 421. In some embodiments, the user must give permission for the application 404 to utilize a particular application category. For example, the user may give permission for the application 404 to utilize one or more application categories during installation of the application 404. As another example, the user may dynamically indicate permission to utilize a particular application category, such as in response to a prompt from the OS 406.

In other embodiments, a network operator must give permission for the application 404 to utilize a particular application category. For example, the network operator may permit a game application to utilize a "General-Purpose" application category, but refuse permission for the game application to utilize a "Mission-Critical" application category. In one embodiment, the network operator may provision the UE 402 with a list of applications permitted to utilize an application category supported in the operator's network. The list of applications may be a whitelist (e.g., only applications on the whitelist are approved to utilize an application category), a blacklist (e.g., applications on the blacklist are denied from utilizing an application category), or other suitable list.

The connectivity manager 408 also determines whether the UE 402 has already established a network connection that supports the received application category parameter 421. For example, the connectivity manager 408 may maintain a list of established (active) network connections and an application category supported by the network connection (or, alternatively, a network slice 145 associated with the connection). In response to a network connection already being established that supports the received application category parameter 421, then the OS will transfer data for the application 404 using the established network connection. Otherwise, the connectivity manager 408 sends a request to establish a data connection. Here it is presumed that the connection will be established via cellular modem (e.g., the "Request Network Connection" message 420 may include a transport type parameter specifying cellular connection and/or the OS 406 may select the cellular modem as the best, or only, available modem). Accordingly, the connectivity manager 408 sends an "Establish Data Connection" message 422 to the cellular modem 410, specifically to the NAS layer 412. Similar procedures may be used with other modems (e.g., WIFI®).

The "Establish Data Connection" message 422 includes the application category parameter 421. In some embodiments, the "Establish Data Connection" message 422 also includes an Access Point Name ("APN") parameter indicating a specific APN with which the cellular modem 410 should establish a connection. The APN may be selected based on a type of service requested. For example, the APN may be selected based on a value of a network capabilities parameter included in the "Request Network Connection" message 420.

The NAS layer 412 receives the "Establish Data Connection" message 422 and creates an initial NAS message. Then, the NAS layer 412 forwards the NAS message to the RRC layer 414. For example, according to 3GPP LTE procedures, the NAS layer 412 may create and forward a "NAS Attach Request" message 424. In another example, may create and forward a "NAS PDN Connectivity Request" message. When using other communication standard procedures, the NAS layer 412 may create an equivalent attach request message.

The "NAS Attach Request" message 424 includes the application category parameter 421. In some embodiments, the "NAS Attach Request" message 424 also includes a PLMN identity ("PLMN-ID") parameter, selected according to established procedures. The PLMN identity is used by the radio access network in case the radio access network is shared by several PLMNs in order to direct the UE's traffic to one of these PLMNs.

The RRC layer 414 receives the "NAS Attach Request" message 424 and determines a radio signaling procedure based on the application category parameter 421. For example, when the application category parameter 421 has a specific value, the RRC layer may determine that no RRC connection is required. However, for other application category parameter 421 values, the RRC layer may trigger an RRC connection 426, for example, by sending an RRC Connection Request message to the eNB 416 and receiving an RRC Connection Setup message in return.

In all cases, the RRC layer 414 sends an RRC message to the eNB 416 based on the received "NAS Attach Request" message 424. As depicted, this message may be an RRC connection setup message 428, such as an "RRC Connection Setup Complete" message (according to the existing 3GPP LTE standards), but any other message defined in a radio protocol can be used.

The RRC connection setup message 428 includes the application category parameter 421. In one embodiment, the RRC layer 414 may send an "RRC Connection Setup Complete" message 428 in response to receiving an RRC Connection Setup message. However, in other embodiments, the RRC layer 414 may send a non-setup RRC message to the eNB 416, the non-setup RRC message including the application category parameter 421, for example in response to the RRC layer 414 determining that no RRC connection is required. In some embodiments, the "RRC Connection Setup Complete" message 428 may also include other parameters from the initial NAS Message (e.g., the "NAS Attach Request" message 424), such as the selected PLMN-ID.

Upon receiving the RRC message 428, the eNB 416 selects 430 a network slice 145 with which to create the requested network connection based on the application category parameter 421. In some embodiments, selecting 430 the network slice 145 includes the eNB 416 identifying a network slice that supports (e.g., is optimized to support) an application category indicated in the application category parameter 421 and selecting an MME of the identified network slice 145. The eNB 416 may further establish a network connection between the UE 402 and the network slice 145 (e.g., the MME), as described below with reference to FIG. 6.

Figure 7:
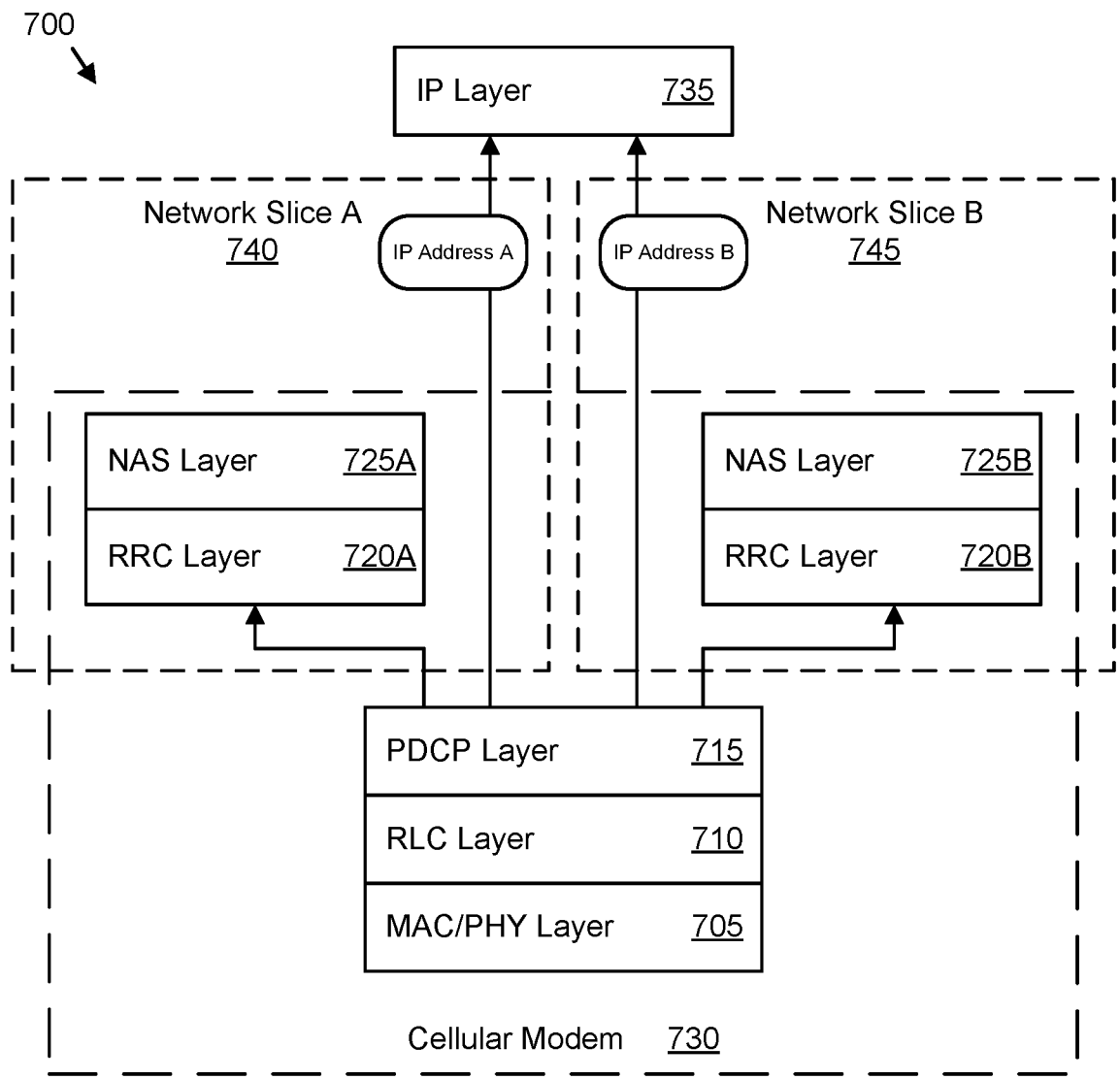
FIG. 7 is a schematic block diagram illustrating one embodiment of a protocol stack supporting network slicing.

In some embodiments, a second application (not shown) running on the UE 402 may request a network connection using a different application category parameter 421. In such embodiments, the UE 402 will request a second network connection, the second network connection being to a second network slice 145b that supports (e.g., is optimized to support) the application category indicated in the different application category parameter 421. Accordingly, the UE 402 may end up being attached to two different network slices 145 and having two different IP connections, as depicted in FIG. 7.

The network attach procedure 400 assumes that the application 404 is capable of explicitly requesting a network connection for a certain application category (e.g., due to the inclusion of the application category parameter 421 in the "Request Network Connection" message 420). However, legacy applications may be incapable of explicitly requesting a network connection for a certain application category, but instead may send a request that does not include an application category parameter 421. Additionally, some applications may simply request to send data packets without prior requesting a network connection with specific characteristics. Network attach procedures where an application category parameter 421 is not sent by an application are addressed below with reference to FIG. 5.

Figure 5:
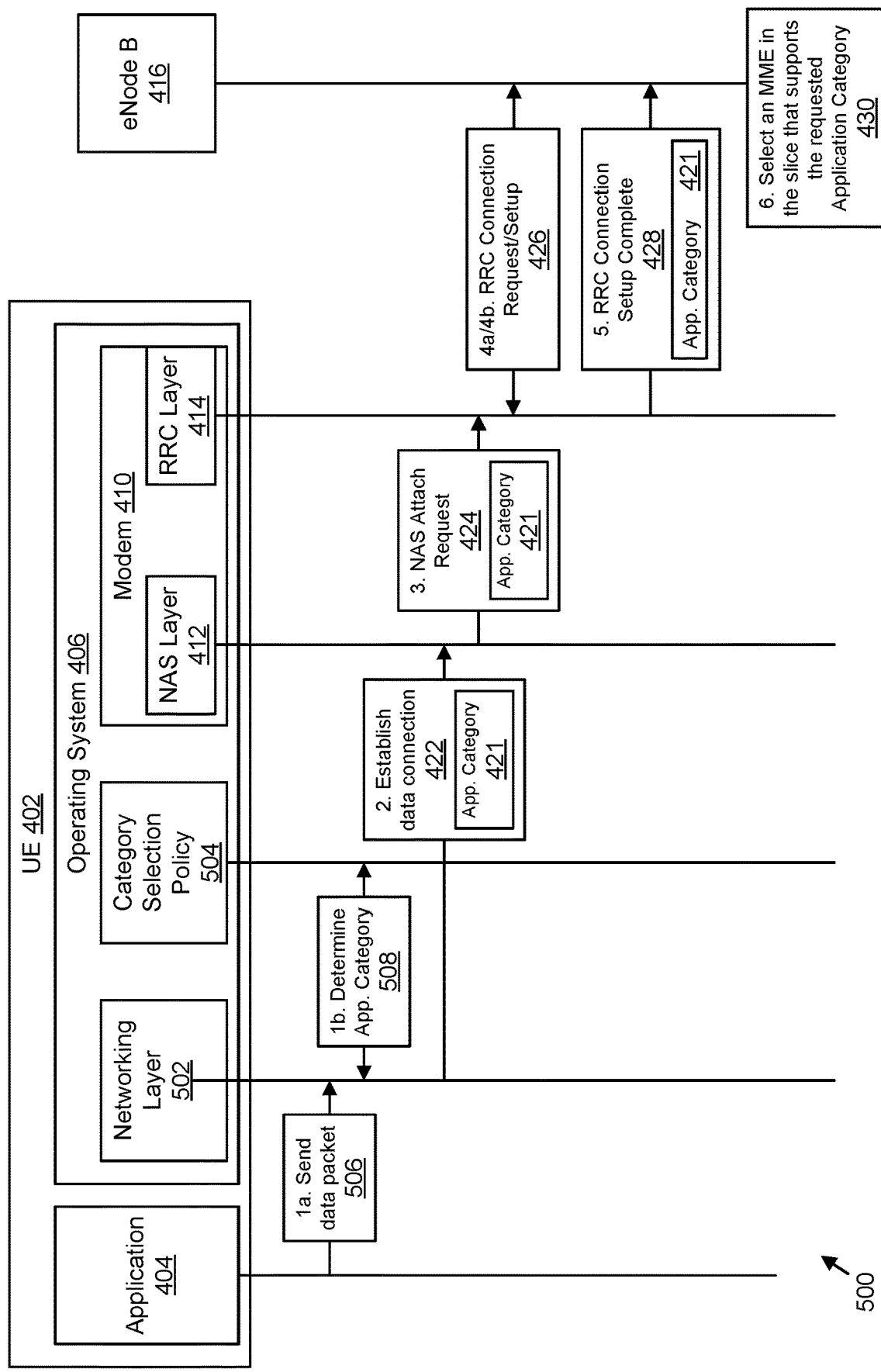
FIG. 5 illustrates another embodiment of a network attach procedure used for supporting network slicing.

FIG. 5 illustrates another embodiment of a network attach procedure 500 used for supporting network slicing. The network attach procedure 500 represents an alternative to the network attach procedure 400. While the network attach procedure 500 is directed primarily to embodiments where an application does not explicitly requesting a network connection for a certain application category, in some embodiments the network attach procedure 500 may be used to even when an application explicitly requests a network connection for a certain application category.

In the illustrated embodiment, communication with a UE 402 and an eNode B ("eNB") 416 are illustrated. Moreover, communication between an application 404 running on the UE 402 and an operating system ("OS") 406 running on the UE 402 are illustrated. The OS 406 may include a networking layer 502, a category selection policy 504, and a cellular modem 410. The cellular modem 410 may include a non-access stratum ("NAS") layer 412 and a radio resource control ("RRC") layer 414 as part of the access stratum. In certain embodiments, the UE 402, the cellular modem 410, and the eNB 416 may substantially similar to those described above with reference to FIG. 4.

As illustrated, the application 404 may request 506 to send a data packet to the network. In one embodiment, the application 404 requests to send the data packet without prior requesting a network connection to establish a network connection with certain characteristics. In another embodiment, the application 404 may send a network connection request that lacks an indication of an application category. In such an embodiment, the network connection may include a "network capabilities" parameter indicating a requested network service type and/or a "transport type" parameter indicating a requested type of transport. The "network capabilities" parameter and the "transport type" parameter are described above, with reference to FIG. 4.

The OS, upon receiving the request 506 to send a data packet, routes the request to the networking layer 502. The networking layer 502 consults 508 the category selection policy 504 to determine an application category for the request 506. The category selection policy 504 contains rules for associating a data packet with a particular application category parameter 421. The category selection policy 504 may determine the application category parameter 421 based on an identity of the application 404, an application type of the application 404 (e.g., game, utility, productivity, navigation, music, etc.), a recipient address or address range (e.g., IP address, domain name, etc.), a transport protocol (e.g., transmission control protocol ("TCP"), user datagram protocol ("UDP"), etc.), a recipient port number (e.g. HTTP port 80), or combinations thereof. In some embodiments, the rules of the category selection policy 504 are arranged into a hierarchy such that rules of a higher rank may override rules of a lower rank.

For example, the category selection policy 504 may include rules that data packets from a particular application "Application-x" are to be associated with "Application Category=Mission-Critical," while data packets from another application "Application-y" are to be associated with "ApplicationCategory=Infrequent Messaging." As another example, the category selection policy 504 may include a rule that data packets addressed to the domain "example.IoT.com" should be associated with "Application Category=Infrequent Messaging." As a further example, the category selection policy 504 may include a rule that UDP data packets are to be associated with "Application Category=General-Purpose." In yet another example, the category selection policy 504 may include a rule that TCP data packets destined to 143.128.1.0/24 (as an example of an IP address range) should be associated with "Application Category=Mission-Critical." The category selection policy 504 may also include a catch-all rule that any data packet not explicitly associated with "ApplicationCategory=Mission-Critica/" or "ApplicationCategory=Infrequent Messaging" are to be associated with "ApplicationCategory=General-Purpose."

The category selection policy 504 may be statically pre-configured in the UE or may be provisioned and managed over-the-air by a network management entity, for example by the Access Network Discovery & Selection Function ("ANDSF") specified in the 3GPP specifications. Where the UE 402 operates using other standards, the category selection policy 504 may be provisioned by an equivalent network management entity. In one embodiment, the category selection policy 504 is created by a network operator and is provisioned in the UE 402 for steering UE traffic to the various network slices 145 in the mobile core network 140 or other packet core (e.g. the "5G packet core"). As an example, a mobile network operator may provision a category selection policy 504 in the UE 402 that steers all traffic of a certain application in the UE to a network slice 145 optimized to support IoT services.

In some embodiments, the networking layer 502 may verify an application category parameter 421 where the request 506 to send a data packet is a network connection request that includes an application category parameter 421. For example, the category selection policy 504 may include one or more rules based on the identity or application type of the application 404 that override any application category parameter 421 included in a network connection request from the application 404. In other embodiments, the networking layer 502 may override a rule in the category selection policy 504 in response to the request 506 being a network connection request that includes an application category parameter 421. For example, the category selection policy 504 may include one or more rules based on the recipient address, data packet type, or transport protocol type that are overridden by an application category parameter 421 included in a network connection request from the application 404.

Having determined the application category parameter 421 for the received data packet, the networking layer 502 may also determine whether the UE 402 has already established a network connection that supports the received application category parameter 421. For example, the networking layer 502 may maintain a list of established (active) network connections and an application category supported by the network connection (or, alternatively, a network slice 145 associated with the connection). In response to a network connection already being established that supports the received application category parameter 421, then the OS will transfer data for the application 404 using the established network connection. Otherwise, the networking layer 502 sends a request to establish a data connection. Here it is presumed that the connection will be established via cellular modem (e.g., the "Request Network Connection" message 420 may include a transport type parameter specifying cellular connection and/or the OS 406 may select the cellular modem as the best, or only, available modem). Accordingly, the networking layer 502 sends an "Establish Data Connection" message 422 to the cellular modem 410, specifically to the NAS layer 412. Similar procedures may be used with other modems (e.g., WIFI®).

As discussed above, the "Establish Data Connection" message 422 includes the application category parameter 421 and optionally includes an Access Point Name ("APN") parameter. The NAS layer 412 receives the "Establish Data Connection" message 422 and creates an initial NAS message. Then, the NAS layer 412 forwards the NAS message to the RRC layer 414. For example, according to 3GPP LTE procedures, the NAS layer 412 may create and forward a "NAS Attach Request" message 424. In another example, may create and forward a "NAS PDN Connectivity Request" message. When using other communication standard procedures, the NAS layer 412 would create an equivalent attach request message.

As discussed above, the "NAS Attach Request" message 424 includes the application category parameter 421, and optionally includes a PLMN identity ("PLMN-ID") parameter. The RRC layer 414 receives the "NAS Attach Request" message 424 and determines a radio signaling procedure based on the application category parameter 421. For example, when the application category parameter 421 has a specific value, the RRC layer 414 may determine that no RRC connection is required. However, for other application category parameter 421 values, the RRC layer may trigger an RRC connection 426, for example, by sending an RRC Connection Request message to the eNB 416 and receiving an RRC Connection Setup message in return.

As before, the RRC layer 414 sends an RRC message to the eNB 416 based on the received "NAS Attach Request" message 424. In the depicted embodiment, the RRC layer 414 sends an RRC connection setup message 428 that includes the application category parameter 421. For example, the RRC layer 414 may send an "RRC Connection Setup Complete" message in response to receiving an RRC Connection Setup message. However, in other embodiments, the RRC layer 414 may send a non-setup RRC message to the eNB 416, the non-setup RRC message including the application category parameter 421, for example in response to the RRC layer 414 determining that no RRC connection is required. Upon receiving the RRC message 428, the eNB 416 selects 430 a network slice 145 with which to create the requested network connection based on the application category parameter 421. In some embodiments, selecting 430 the network slice 145 includes the eNB 416 identifying a network slice that supports (e.g., is optimized to support) an application category indicated in the application category parameter 421 and selecting an MME of the identified network slice 145. The eNB 416 may further establish a network connection between the UE 402 and the network slice 145 (e.g., the MME), as described below with reference to FIG. 6.

In some embodiments, a second application (not shown) running on the UE 402 may also request to send a data packet and the category selection policy 504 may determine a different application category parameter 421 from the application 404. In such embodiments, the UE 402 will request a second network connection, the second network connection being to a second network slice 145b that supports (e.g., is optimized to support) the application category indicated in the different application category parameter 421. Accordingly, the UE 402 may end up being attached to two different network slices 145 and having two different IP connections, as discussed below with reference to FIG. 7.

Figure 6:
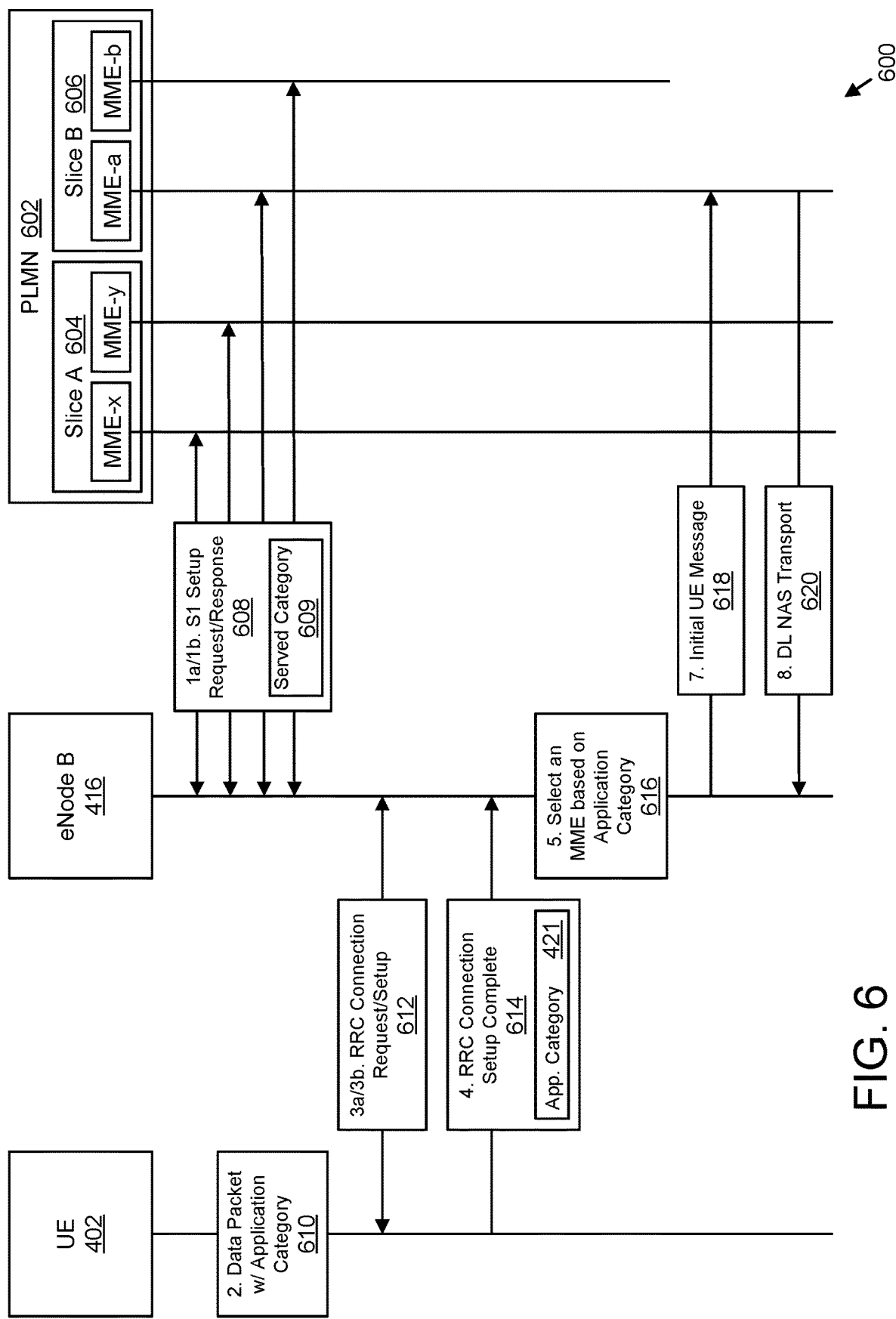
FIG. 6 illustrates a further embodiment of a network attach procedure used for supporting network slicing.

FIG. 6 illustrates a further embodiment of a network attach procedure 600 used for supporting network slicing. In the illustrated embodiment, communication between a UE 402 and an eNB 416 are illustrated. Moreover, communication between the eNB 416 and the packet core in a PLMN 602 is illustrated. The UE 402 and the eNB 416 may be embodiments of a remote unit 105 and base unit 110, respectively, and may be substantially similar to the UE 402 and eNB 416 discussed above with reference to FIGS. 4 and 5.

The PLMN 602 includes a first network slice ("Slice A") 604 and a second network slice ("Slice B") 606. Each network slice 604, 606 may include at least two MMEs (e.g., Slice A 604 may include at least a MME-x and MME-y, while Slice B 606 may include at least a MME-a and MME-b). Furthermore, the MMEs of the network slices may include features similar to those found in the base unit 110 (e.g., the MMEs may include a processor 305, a memory 310, an input device 315, a output device 320, a radio transceiver 325, and/or a network interface 330).

The network attach procedure 600 shows how the eNB 416 (or equivalent base station) selects an MME (or equivalent management entity) in a network slice based on the application category parameter 421 requested by the UE 402. As illustrated, the eNB 416 establishes S1 signaling connections with multiple MMEs according to the existing 3GPP specifications. In some embodiments, these connections are established when the eNB 416 is first initialized and brought into service.

Establishing S1 signaling connections includes exchanging 608 S1 Setup Request and Setup Response messages between the eNB and each MME. The eNB 416 sends conventional S1 Setup Request messages (1a.) and receives S1 Setup Response messages (1b.) from each MME which include a served category parameter 609. The served category parameter 609 indicates an application category supported by the specific MME. Through the exchange 608 of S1 Setup messages, the eNB 416 identifies an application category supported by every connected MME.

For example, in MME-x and MME-y (which are part of Slice A 604) may indicate Served Application Category= Mission-Critical. This served category parameter 609 indicates that MME-x and MME-y are part of a network slice (e.g., Slice A 604) that is optimized to support low-latency, high-reliability (e.g., Mission-Critical) communications. Similarly, MME-a and MME-b (which are part of Slice B 606) may indicate Served ApplicationCategory=General-Purpose, to indicate that these MMEs are part of a network slice (e.g., Slice B 606) that supports mobile broadband services.

At some point in time, the UE 402 receives 610 a data packet (e.g., from an application 404 running on the UE) and identifies an application category associated with the data packet. In some embodiments, the data packet is a network connection request, such as the "Request Network Connection" message 420 discussed above which contains an application category parameter 421. In such embodiments, identifying the application category includes parsing the network connection request to identify the application category parameter 421. In other embodiments, the data packet is a network connection request without an application category parameter 421 or simply a request to send data packets without prior requesting a network connection. In such embodiments, the UE 402 may determine an application category parameter 421 based on a category selection policy 504. Here it is assumed that the UE 402 does not already have an established network connection to a network slice corresponding to the application category.

The UE 402 may optionally exchange 612 RRC connection request/setup messages with the eNB 416, as discussed above with reference to FIGS. 4 and 5. For example, an RRC layer 414 may trigger the exchange 612 of RRC connection messages. Regardless of whether RRC connection request/setup messages 612 are exchanged, the UE 402 transmits an RRC connection setup complete message 614 to the eNB 416 which includes an application category parameter 421 indicating the application category identified for the data packet.

The eNB 416 selects 616 a MME associated with the indicated application category. In some embodiments, the selecting 616 the MME includes determining whether the eNB 416 is connected to any MMEs that support the indicated application category. For example, the eNB 416 may generate a list, table, or other data structure that maps connected MMEs to application categories based on the served category parameter 609 received during the exchange 608 of S1 setup messages. The eNB 416 may then refer to the list, table, etc. when determining whether the eNB 416 is connected to any MMEs that support the indicated application category.

Where more than one connected MME supports the indicated application category, selecting 616 the MME may include selecting one of the supporting MMEs based on MME capacity, MME overload conditions, or other suitable criteria. Where no connected MMEs support the indicated application category, the eNB may select an alternative (e.g., next best) MME. For example, the eNB 416 may select a MME in a "general-purpose" or "mobile broadband" supporting network slice 145 in response to no connecting MMEs supporting a ApplicationCategory=Mission-Critical or ApplicationCategory=Infrequent Messaging application category parameter 421. Alternatively, the eNB 416 may send an RRC connection reject message indicating that the indicated application category is not supported in response to no connected MMEs supporting the indicated application category.

As illustrated in FIG. 6, the eNB 416 selects the MME-a in the Slice B 606 based on the indicated application category. For example, the application category parameter 421 may indicate a general-purpose application category, which is supported by the Slice B 606. After the eNB 416 selects an MME in an appropriate network slice (here the MME-a) based on the indicated application category, the eNB carries out the known S1 procedures to connect the UE with the selected MME. Here, the eNB 416 sends an "Initial UE Message" 618 and receives a "DL NAS Transport" message in return from the MME in Slice B 606. Thus, the eNB 416 attaches the UE 402 to a MME in the appropriate network slice by matching the application category requested by the UE (in the application category parameter 421) with the served category parameter 609 received from the connected MMEs.

FIG. 7 illustrates one embodiment of a protocol stack 700 of a remote unit 105 used for supporting network slicing. In some embodiments, the depicted protocol stack 700 is a result of the network attach procedures 400, 500, and/or 600 used for supporting network slicing. The protocol stack 700 corresponds to a remote unit 105 communicating simultaneously with two network slices (e.g., both network slice A 740 and network slice B 745). In particular, the remote unit 105 has multiple instances of NAS and RRC radio protocols, each instance corresponding to a different network slice 740, 745. Essentially, the remote unit 105 is simultaneously attached to two different packet core instances (e.g. EPC instances) in the same PLMN.

The protocol stack 700 includes a media access control ("MAC") sublayer and a physical layer ("PHY"), shown as "MAC/PHY layer" 705. In general, the physical layer 705 serves to generate a radio signal for communicate bits or symbols over a wireless communication link 115. The protocol stack 700 also includes a radio link control ("RLC") layer 710 in communication with the physical layer 705. In general, the RLC layer 710 transfers protocol data units ("PDUs") from higher protocol layers, controls PDU segmentation/concatenation and sequencing, and error correction via automatic repeat request ("ARQ").

The protocol stack 700 further includes a packet data convergence protocol ("PDCP") layer 715 in communication with the RLC layer 710. In general, the PDCP layer 715 provides header compression/decompression of IP data and transfers user plane (or control plane) data. The PDCP layer 715 communicates control plane data with an RRC layer (e.g., RRC layer 720A and/or RRC layer 720B) and communicates user plane data with an IP layer 735. As depicted, the protocol stack 700 includes one instance for each of the physical layer 705, the RLC layer 710, the PDCP layer 715, and the IP layer 735.

The protocol stack 700 further includes different instances of radio resource control ("RRC") layers and non-access stratum ("NAS") layers for connections to different network slices. In general, the RRC layer manages establishment, maintenance, and release of an RRC connection between the remote unit 105 and the base unit 110. In general, the NAS layer supports mobility of a remote unit 105 and the session management procedures to establish and maintain IP connectivity for the remote unit 105.

As depicted, the protocol stack 700 includes a first RRC layer 720A and a first NAS layer 725A associated with a connection to the network slice A 740. Further, the protocol stack 700 includes a second RRC layer 720B and a second NAS layer 725B associated with a connection to the network slice B 745. Note that the separate connections to the network slices are also associated with separate IP addresses (e.g., IP addresses A and B associated with the network slices A and B, respectively). Accordingly, the IP layer 735 and the PDCP layer 715 may communicate using an IP address for each network slice in communication with the cellular modem 730. While the protocol stack 700 is depicted using fourth generation (4G) 3GPP LTE radio protocols, the same principles apply to other radio protocol standards.

Figure 8:
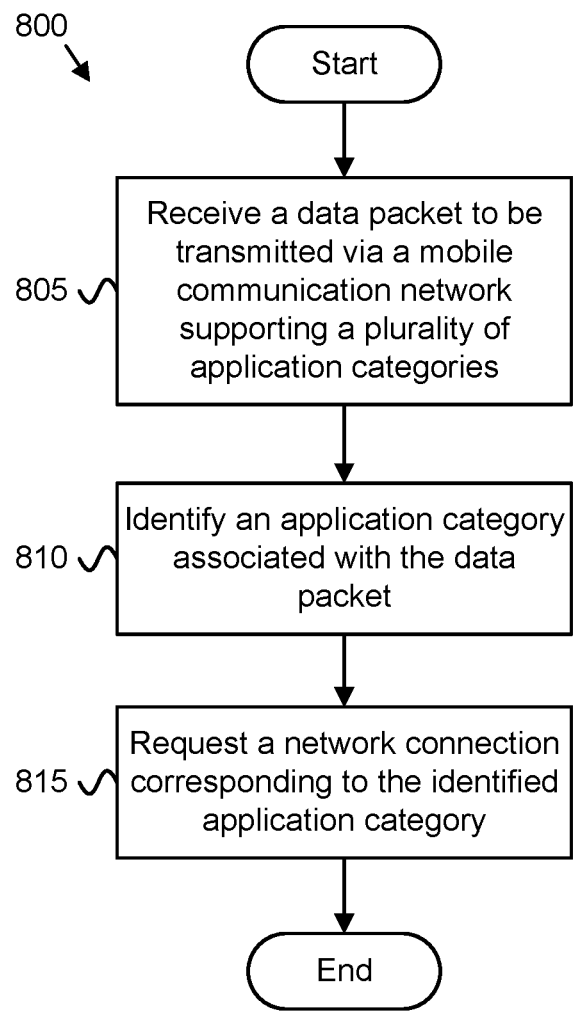
FIG. 8 is a schematic flow chart diagram illustrating one embodiment of a method of a remote unit for supporting network slicing.

FIG. 8 is a schematic flow chart diagram illustrating one embodiment of a method 800 for supporting network slicing. In some embodiments, the method 800 is performed by an apparatus, such as the remote unit 105, the user equipment apparatus 200, and/or the UE 402. In certain embodiments, the method 800 may be performed by a processor executing program code, for example, a microcontroller, a microprocessor, a CPU, a GPU, an auxiliary processing unit, a FPGA, or the like.

The method 800 may include receiving 805 a data packet to be transmitted via a mobile communication network, wherein the mobile communication network supports a plurality of application categories. In one embodiment, the processor 205 of the user equipment apparatus 200 receives the data packet, e.g., from an application running on the user equipment apparatus 200. In another embodiment, the OS 406 receives a data packet from an application 404 running on the UE 402. In certain embodiments, the receiving 805 the data packet includes receiving a network connection request. In one embodiment, the network connection request includes an application category parameter.

The method 800 includes identifying 810 an application category associated with the data packet. In one embodiment, the processor 205 of the user equipment apparatus 200 identifies 810 the application category. For example, an application running on the processor 205 may identify 810 the application category. In another embodiment, the connectivity manager 408 and/or the networking layer 502 may identify 810 the application category. In certain embodiments, the application category may be selected from the group consisting of: a mission-critical application, an infrequent messaging application, and a general-purpose application In some embodiments, identifying 810 the application category associated with the data packet includes applying a category selection policy to the data packet. The category selection policy may be stored on a storage device, such as the memory 210, and may contain one or more rules for selecting an application category based on data packet characteristics. In certain embodiments, the category selection policy is received from an access network discovery and selection function ("ANDSF") of the mobile telecommunication network.

Where the data packet comprises a network connection request, identifying 810 the application category associated with the network connection request may include parsing the network connection request for an application category parameter. Additionally, identifying 810 the application category may include searching the category selection policy for a rule specific to the network connection request that overrides the application category parameter and identifying an overriding application category from the overriding rule.

The method 800 includes requesting 815 a network connection corresponding to the identified application category. The method 800 ends. In one embodiment, the processor 205 of the user equipment apparatus 200 controls the transceiver 225 to send a network connection request to a base unit 110. In another embodiment, the cellular modem 410 (specifically, the RRC layer 414 of the cellular modem 410) may send an RRC connection message to the eNode B 416. In certain embodiments, requesting 815 a network connection corresponding to the identified application category includes sending a connection setup message (e.g., an RRC Connection Setup Complete message) that indicates the identified application category (e.g., via the application category parameter 421).

In some embodiments, requesting 815 a network connection corresponding to the identified application category includes requesting a connection to a network slice that supports the identified application category. In certain embodiments, requesting 815 a network connection corresponding to the identified application category includes communicating simultaneously over a plurality of network connections, each network connection being to a different network slice of the mobile communication network.

In some embodiments, requesting 815 a network connection corresponding to the identified application category includes determining whether a network connection corresponding to the identified application category exists between the method and the mobile communication network. If a network connection corresponding to the identified application category already exists, then requesting 815 the network connection may include the existing network connection accessing (e.g., requesting access to the network connection corresponding to the identified application category). Otherwise, if a network connection corresponding to the identified application category does not already exist, then requesting 815 the network connection may include establishing a new network connection with the mobile communication network for the identified application category.

Figure 9:
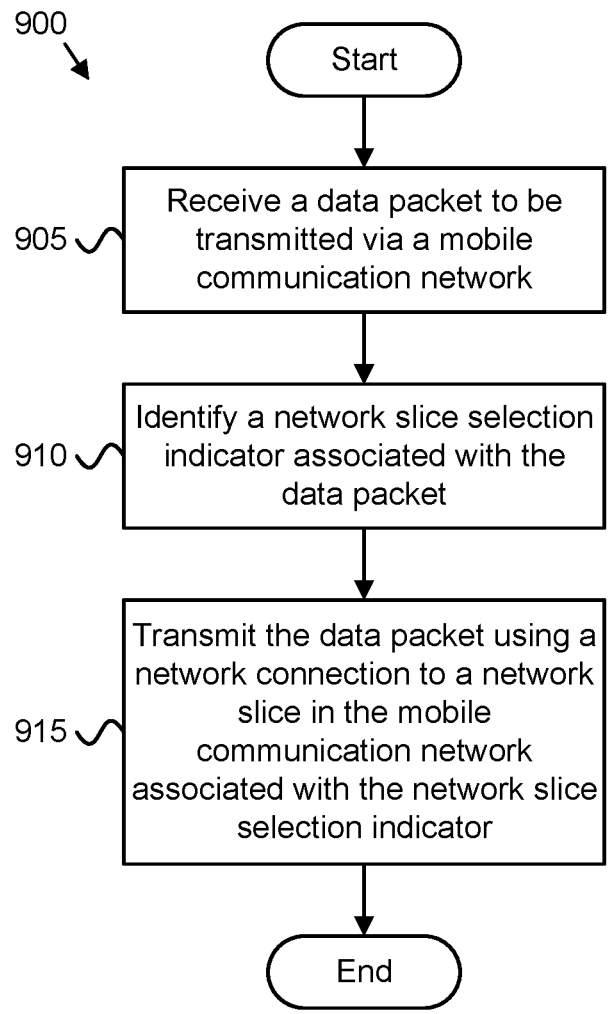
FIG. 9 is a schematic flow chart diagram illustrating another embodiment of a method of a remote unit for supporting network slicing.

FIG. 9 is a schematic flow chart diagram illustrating one embodiment of a method 900 for supporting network slicing. In some embodiments, the method 900 is performed by an apparatus, such as the remote unit 105, the user equipment apparatus 200, and/or the UE 402. In certain embodiments, the method 900 may be performed by a processor executing program code, for example, a microcontroller, a microprocessor, a CPU, a GPU, an auxiliary processing unit, a FPGA, or the like.

The method 900 may include receiving 905 a data packet to be transmitted via a mobile communication network, the mobile communication network supporting a plurality of application categories, where the data packet is generated by an application running on the apparatus. In one embodiment, an application running on the user equipment apparatus 200 generates the data packet. In another embodiment, an OS 406 running on the UE 402 generates the data packet. In certain embodiments, the receiving 905 the data packet includes receiving a network connection request. In one embodiment, the network connection request includes an application category parameter.

The method 900 includes identifying 910 a network slice selection indicator associated with the data packet. As used herein, a "network slice selection indicator" refers to an indication used to select a particular network slice 145 or a category of network slice 145. One example of a network slice selection indicator includes the application category parameter. In one embodiment, the processor 205 of the user equipment apparatus 200 identifies 910 the application category. For example, an application running on the processor 205 may identify 910 the network slice selection indicator by identifying an application category to which the data packet (or application generating the data packet) belongs. In another example, the connectivity manager 408 and/or the networking layer 502 may identify 910 the network slice selection indicator by identifying an application category associated with the data packet. In certain embodiments, the application category may be a mission-critical application, an infrequent messaging application, or a general-purpose application In some embodiments, identifying 910 the network slice selection indicator associated with the data packet includes applying a category selection policy to the data packet. The category selection policy may be stored on a storage device, such as the memory 210, and may contain one or more rules for selecting a network slice selection indicator based on data packet characteristics. In certain embodiments, the category selection policy is received from an access network discovery and selection function ("ANDSF") of the mobile telecommunication network.

Where the data packet comprises a network connection request, identifying 910 the network slice selection indicator associated with the network connection request may include parsing the network connection request for a selection parameter, such as an application category parameter. Additionally, identifying 910 the application category may include searching the category selection policy for a rule specific to the network connection request that overrides the application category parameter included in the network connection request and identifying an overriding application category from the overriding rule.

The method 900 includes transmitting 915 the data packet using a network connection to a network slice in the mobile communication network, said network connection associated with the identified network slice selection indicator. The method 900 ends. In one embodiment, the processor 205 controls the transceiver 225 to send the data packet.

In some embodiments, transmitting 915 the data packet using a network connection associated with the identified network slice selection indicator includes determining whether a network connection associated with the identified network slice selection indicator exists between the apparatus and the mobile communication network. If such a network connection already exists, then the data packet is sent over the existing network connection. Otherwise, if a network connection associated with the network slice selection indicator does not already exist between the apparatus and the mobile communication network, then transmitting 915 the data packet includes establishing a new network connection with the indicated network slice and transmitting the data packet comprises transmitting via the new network connection.

Figure 10:
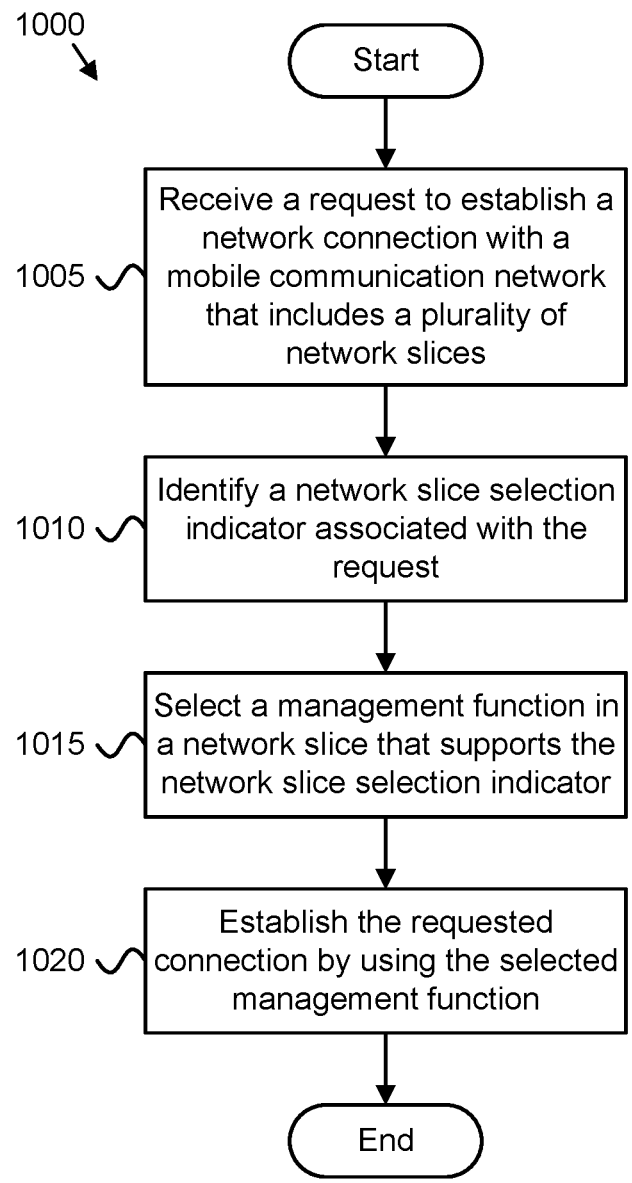
FIG. 10 is a schematic flow chart diagram illustrating one embodiment of a method of a base unit for supporting network slicing.

FIG. 10 is a schematic flow chart diagram illustrating one embodiment of a method of a base unit for supporting network slicing. In some embodiments, the method 1000 is performed by an apparatus, such as the base unit 110, the base station apparatus 300, and/or the eNB 416. In certain embodiments, the method 1000 may be performed by a processor executing program code, for example, a microcontroller, a microprocessor, a CPU, a GPU, an auxiliary processing unit, a FPGA, or the like.

The method 1000 begins with receiving 1005, e.g., from a remote unit, a request to establish a network connection with a mobile communication network, wherein the mobile communication network includes a plurality of application categories. In one embodiment, the radio transceiver 325 of the base station apparatus 300 receives a network connection request.

The method 1000 includes identifying 1010 a network slice selection indicator associated with the request. In one embodiment, the processor 305 of the base station apparatus 300 identifies 810 the network slice selection indicator, for example from an RRC connection setup message of the network connection request.

The method 1000 includes selecting 1015 a management function in a network slice that supports the network slice selection indicator. In some embodiments, selecting 1015 the management function in a network slice based on the network slice selection indicator includes identifying a network slice 145 that supports an application category indicated in the network slice selection indicator. In various embodiments, the application category is selected from the group consisting of: a mission-critical application, an infrequent messaging application, and a general-purpose application.

In some embodiments, the apparatus has pre-established a signaling connection with a management function in each network slice, each management function (or network slice) being associated with a traffic type. Here, selecting 1015 the management function in a network slice based on the network slice selection indicator includes matching the network slice selection indicator to a network slice using the traffic type associated with the management function in a network slice.

The method 1000 includes establishing 1020 the requested connection by using the selected management function in the network slice. The method 1000 ends. In various embodiments, establishing 1020 the requested connection by using the selected management function in the selected network slice comprises sending an initial UE message to the selected management function and receiving a downlink NAS transport message from the selected management function.

Figure 11:
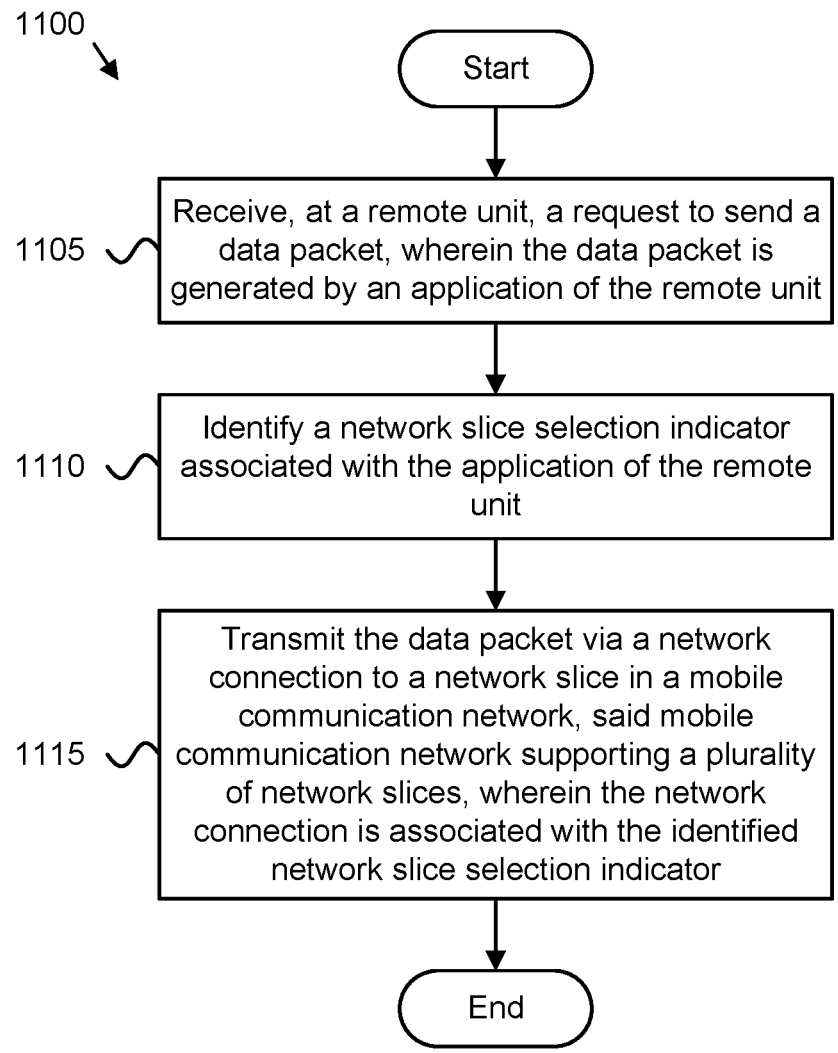
FIG. 11 is a schematic flow chart diagram illustrating one embodiment of a method of a remote unit for selecting a network slice.

FIG. 11 is a schematic flow chart diagram illustrating one embodiment of a method of a remote unit for selecting a network slice, e.g., in a mobile communication network. In some embodiments, the method 1100 is performed by an apparatus, such as the remote unit 105, the user equipment apparatus 200, and/or the UE 402. In certain embodiments, the method 1000 may be performed by a processor executing program code, for example, a microcontroller, a microprocessor, a CPU, a GPU, an auxiliary processing unit, a FPGA, or the like.

The method 1100 begins with receiving 1105, e.g., at a remote unit, a request to send a data packet, wherein the data packet is generated by an application of the remote unit. In some embodiments, receiving 1105 the request to send the data packet includes receiving a network connection request that contains an application category parameter.

In some embodiments, receiving 1105 the request to send the data packet comprises receiving a network connection request that contains a network capability parameter. In some embodiments, receiving the request to send the data packet comprises receiving a network connection request that contains a transport type parameter. In certain embodiments, the transport type parameter indicates one or more of: an access network type, a virtual private network, a transport protocol, and a modem type.

The method 1100 includes identifying 1110 a network slice selection indicator associated with the application of the remote unit. In some embodiments, identifying the network slice selection indicator associated with the application comprises verifying the application category parameter using a selection policy. In one embodiment, verifying the application category parameter using a selection policy includes determining whether the application is permitted to use a network slice associated with the application category parameter.

In some embodiments, the remote unit receives a selection policy from the mobile communication network, the selection policy being stored at the remote unit and comprising a plurality of rules for selecting a network slice based on the application. In such embodiments, identifying 1110 the network slice selection indicator associated with the application includes applying the selection policy to the application.

In some embodiments, identifying 1110 the network slice selection indicator associated with the application includes applying a selection policy to the network capability parameter to select the network slice selection indicator. In some embodiments, identifying 1110 the network slice selection indicator associated with the application includes applying a selection policy to the transport type parameter to select the network slice selection indicator.

The method 1100 includes transmitting 1115 the data packet via a network connection to a network slice in a mobile communication network. Here, the mobile communication network supports a plurality of network slices and the network connection is associated with the identified network slice selection indicator. The method 1100 ends. In one embodiment, the network connection to a network slice in the mobile communication network comprises a connection to a network slice that supports a traffic type associated with the application.

In some embodiments, transmitting 1115 the data packet via the network connection to the network slice includes: determining whether a network connection associated with the identified network slice selection indicator exists between the remote unit and the mobile communication network, transmitting the data packet via an existing network connection in response to determining that a network connection associated with the network slice selection indicator exists between the remote unit and the mobile communication network, and establishing a new network connection with the identified network slice selection indictor for transmitting the data packet in response to determining that a network connection associated with the network slice selection indicator does not exist between the remote unit and the mobile communication network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a transceiver that communicates with a mobile communication network supporting a plurality of network slices; and
   a processor that:
   receives a request to send a data packet, wherein the data packet is generated by an application of the apparatus;
   identifies a network slice selection indicator associated with the application of the apparatus; and
   transmits the data packet via a network connection to a network slice in the mobile communication network, wherein the network connection is associated with the identified network slice selection indicator.

2. The apparatus of claim 1, wherein transmitting the data packet via the network connection to the network slice comprises the processor:
   determining whether a network connection associated with the identified network slice selection indicator exists between the apparatus and the mobile communication network;
   transmitting the data packet via an existing network connection in response to determining that a network connection associated with the network slice selection indicator exists between the apparatus and the mobile communication network; and
   establishing a new network connection with the identified network slice selection indictor for transmitting the data packet in response to determining that a network connection associated with the network slice selection indicator does not exist between the apparatus and the mobile communication network.

3. The apparatus of claim 1, wherein the processor further receives a selection policy from the mobile communication network, the selection policy being stored at the apparatus and comprising a plurality of rules for selecting a network slice based on the application, wherein identifying the network slice selection indicator associated with the application comprises the processor applying the selection policy to the application.

4. The apparatus of claim 1, wherein receiving the request to send the data packet comprises receiving a network connection request that contains an application category parameter, wherein identifying the network slice selection indicator associated with the application comprises verifying the application category parameter using a selection policy.

5. The apparatus of claim 4, wherein the application category parameter indicates a category selected from the group consisting of: a mission-critical application, an infrequent messaging application, and a general-purpose application.

6. The apparatus of claim 4, wherein verifying the application category parameter comprises determining whether the application is permitted to use a network slice associated with the application category parameter.

7. The apparatus of claim 1, wherein the network connection to the network slice in the mobile communication network comprises a connection to a network slice that supports a traffic type associated with the application.

8. The apparatus of claim 1, wherein receiving the request send the data packet comprises receiving a network connection request that contains a network capability parameter, wherein identifying the network slice selection indicator associated with the application comprises applying a selection policy to the network capability parameter to select the network slice selection indicator.

9. The apparatus of claim 1, wherein receiving the request to send the data packet comprises receiving a network connection request that contains a transport type parameter, wherein identifying the network slice selection indicator associated with the application comprises applying a selection policy to the transport type parameter to select the network slice selection indicator.

10. The apparatus of claim 9, wherein the transport type parameter indicates one or more of: an access network type, a virtual private network, a transport protocol, and a modem type.

11. A method comprising:
   receiving, at a remote unit; a request to send a data packet, wherein the data packet is generated by an application of the remote unit;
   identifying a network slice selection indicator associated with the application of the remote unit; and
   transmitting the data packet via a network connection to a network slice in a mobile communication network, said mobile communication network supporting a plurality of network slices, wherein the network connection is associated with the identified network slice selection indicator.

12. The method of claim 11, wherein transmitting the data packet via the network connection to the network slice comprises:
   determining whether a network connection associated with the identified network slice selection indicator exists between the remote unit and the mobile communication network;

transmitting the data packet via an existing network connection in response to determining that a network connection associated with the network slice selection indicator exists between the remote unit and the mobile communication network; and establishing a new network connection with the identified network slice selection indictor for transmitting the data packet in response to determining that a network connection associated with the network slice selection indicator does not exist between the remote unit and the mobile communication network.

13. The method of claim 11, further comprising:
receiving a selection policy from the mobile communication network, the selection policy being stored at the remote unit and comprising a plurality of rules for selecting a network slice based on the application,
wherein identifying the network slice selection indicator associated with the application comprises applying the selection policy to the application.

14. The method of claim 11, wherein receiving the request to send the data packet comprises receiving a network connection request that contains an application category parameter, wherein identifying the network slice selection indicator associated with the application comprises verifying the application category parameter using a selection policy.

15. The method of claim 14, wherein the application category parameter indicates a category selected from the group consisting of: a mission-critical application, an infrequent messaging application, and a general-purpose application.

16. The method of claim 14, wherein verifying the application category parameter using a selection policy comprises determining whether the application is permitted to use a network slice associated with the application category parameter.

17. The method of claim 11, wherein the network connection to the network slice in the mobile communication network comprises a connection to a network slice that supports a traffic type associated with the application.

18. The method of claim 11, wherein receiving the request to send the data packet comprises receiving a network connection request that contains a network capability parameter, wherein identifying the network slice selection indicator associated with the application comprises applying a selection policy to the network capability parameter to select the network slice selection indicator.

19. The method of claim 11, wherein receiving the request to send the data packet comprises receiving a network connection request that contains a transport type parameter, wherein identifying the network slice selection indicator associated with the application comprises applying a selection policy to the transport type parameter to select the network slice selection indicator.

20. The method of claim 19, wherein the transport type parameter indicates one or more of: an access network type, a virtual private network, a transport protocol, and a modem type.

* * * * *